(12) United States Patent
Wang et al.

(10) Patent No.: US 8,036,107 B2
(45) Date of Patent: Oct. 11, 2011

(54) LIMITING TRAFFIC IN COMMUNICATIONS SYSTEMS

(75) Inventors: Hao Wang, Beijing (CN); Ajit Kahaduwe, Beijing (CN)

(73) Assignee: Nokia Corporation, Espoo (FI)

( * ) Notice: Subject to any disclaimer, the term of this patent is extended or adjusted under 35 U.S.C. 154(b) by 806 days.

(21) Appl. No.: 11/062,455

(22) Filed: Feb. 22, 2005

(65) Prior Publication Data
US 2006/0153204 A1 Jul. 13, 2006

(30) Foreign Application Priority Data
Dec. 29, 2004 (FI) .................... 20041681

(51) Int. Cl.
*H04J 1/16* (2006.01)
*H04L 12/56* (2006.01)
*H04L 29/06* (2006.01)

(52) U.S. Cl. .................... 370/229; 370/400; 713/153

(58) Field of Classification Search .................. 370/229, 370/400
See application file for complete search history.

(56) References Cited

U.S. PATENT DOCUMENTS
2003/0074582 A1 4/2003 Patel et al.
2004/0255161 A1 12/2004 Cavanaugh
2006/0253903 A1* 11/2006 Krumel .................... 726/13

OTHER PUBLICATIONS
Cisco Systems, Inc., "Policy-Based Routing (White Paper)", 1996, pp. 1-7.

* cited by examiner

*Primary Examiner* — Chirag Shah
*Assistant Examiner* — Srinivasa Reddivalam
(74) *Attorney, Agent, or Firm* — Harrington & Smith

(57) ABSTRACT

Limiting traffic in a communications system is based on monitoring data packets traversing a first network node and determining whether at least one first data packet originating from a source node fulfills a predefined criterion. When the predefined criterion is fulfilled, a second network node is instructed to change processing of at least one second data packet originating from said source node.

17 Claims, 6 Drawing Sheets

LIMITING TRAFFIC IN COMMUNICATIONS SYSTEMS

BACKGROUND OF THE INVENTION

1. Field of the Invention

The present invention relates to limiting traffic in communications system. In particular, but not exclusively, the present invention relates to limiting useless traffic, for example traffic relating to viruses and other malware, in communications systems.

2. Related Art

A communication system can be seen as a facility that enables communication between two or more entities such as user equipment and/or other nodes associated with the system. The communication may comprise, for example, communication of voice, data, multimedia and so on. The communication system may be circuit switched or packet switched. The communication system may be configured to provide wireless communication.

Communication systems able to support mobility of communications devices across a large geographic area are generally called mobile communications system. In cellular communication systems a communications device typically changed the cell via which it communicates. Some examples of a cellular system are the Global System for Mobile Telecommunications (GSM) and General Packet Radio Service (GPRS). GPRS provides packet-switched data services and utilizes the infrastructure of a GSM system. Two further examples of cellular systems are EDGE and EGPRS, which are further enhancements to GSM and GPRS. EDGE refers to Enhanced Data Rates for GSM Evolution, and EGPRS refers to EDGE GPRS.

For illustrating packet-switched services in a cellular communication system, GPRS system is used below as an example. It is, however, appreciated, that similar concepts may be found also in other cellular systems supporting packet-switched services.

FIG. 1 illustrates schematically, as an example of a cellular system supporting packet-switched services, a GSM/GPRS communication system 10. Alternatively, the system 10 may be an EDGE/EGPRS network. Only some of the network elements of a GSM/GPRS network are illustrated in FIG. 1. The radio access network 20 comprises a number of base station systems (BSS). Each base station system comprises a base station controller (BSC) 22 and a number of base stations (BS) 21. A mobile station (MS) 11 communicates with a base station 21 over a radio interface. A packet-switched core network of the system GSM/GPRS system comprises a number of GPRS Supporting Nodes (GSN) 31. Each mobile station registered for packet-switched services has a serving GSN, called SGSN, which is responsible for controlling the packet-switched connections to and from the mobile station. The packet-switched core network is typically connected to further packet-switched networks via a Gateway GSN (GGSN) 32. As FIG. 1 shows, a further packet switched network 40 typically comprises an edge router (ER) 41.

Viruses are a common problem in personal computers (PCs) that are connected to public data networks. The effects of a virus on a computer may various: the computer may totally crash down, the user may notice some oddities or the user may be unaware of a virus infecting his computer. In any case, the virus typically aims to spread further via a network the computer is connected to. Some viruses may scan actively network nodes connected to the network. It is also possible that a node affected by a virus causes, by flooding a network or a server, connections to other nodes to be refused or cut off.

In the following, viruses are used as an example of malware. The term malware is abbreviated from malicious software, and it refers, for example, to various viruses, worms, and spying software. It is also appreciated that although traffic relating to malware is discussed in this description in some detail, network elements may malfunction and cause useless traffic to a communications system also due to other reasons than due to malware infection.

As it is possible to use a personal computer in, for example, a GPRS network by supplying the computer with suitable equipment (often called a card phone), the traffic caused by viruses affects also cellular networks. Furthermore, it is possible that viruses will spread also to other user equipment than personal computers, such as to personal digital assistants (PDAs) or modern portable telephones.

Especially in the radio access network (in wireless environment) communication resources are limited. Useless traffic caused by viruses, by other malware or by malfunctioning devices may cause serious difficulties, such as latency or loss of packets, for normal traffic. Especially connections, where both end points are reachable via a wireless network, are sensitive to latency and loss of packets. Due to latency and/or loss of packets, transport protocols encounter challenges to keep connections alive.

It would be beneficiary to remove viruses from network nodes and clear virus infected data packets. Some known approaches are static cleaning of the network nodes, packet filtering and firewalls. Static cleaning refers to anti-virus software installed/running on a computer or network node. The anti-virus software typically scans stored files or data and seeks featured character queue to identify known viruses. If anti-virus software finds virus infected file or data, the anti-virus software will clean or quarantine the infected object. The effectiveness of static cleaning depends on how well users of computers or other communication devices use anti-virus software.

Packet filtering refers to a network node scanning data packets transmitted via the node or to/from the node. For example, a network address translation (NAT) device may perform also packet filtering. If a data packet seems to be infected (that is, the data packet seems to contain data relating to a virus or be a data packet transmitted by a virus), the suspected packet is typically dropped. Packet filtering can work on a node, whereby transmitted and/or received data packets are filtered. Packet filtering may be implemented at entrance of a network segment. It may prevent traffic from going out from the network segment or into the network segment. Packet filtering usually needs to be based on simple rules, because very detailed analysis of the data packets may cause heavy latency to traffic. In any case, packet filtering typically causes some latency to all traffic. Packet filtering is usually not a practical approach for core networks. FIG. 2 shows, however, a simplified schematic example of packet filtering nodes 51a, 51b placed between edge routers 41a, 41b and a core network 40. The edge routers 41a, 41b are in FIG. 2 called Access Network Edge Routers (ANER). The situation FIG. 2 shows relates to two communications devices 11a, 11b using GRPS networks as access networks. The communications device 11a, 11b in FIG. 2 may be, for example, personal computer equipped with card phones.

A firewall refers to a network node separating typically a network segment from, say, a public packet network. A firewall typically uses packet filtering and may cause latency to all traffic. In a wireless network, more re-transmissions and error corrections are typically needed than in a fixed network. There typically is a certain time limit, within which a data packet should be successfully transmitted. The re-transmission and error corrections together with the latency caused by packet filtering in a firewall may cause too much delay for packets to be successfully transmitted in a wireless network. Rule based packet filtering in a firewall may therefore be an infeasible solution for wireless network segments.

There are thus problems relating to viruses infecting network nodes and/or to the traffic caused by viruses. In addition, useless traffic originating from malfunctioning device may cause problems. Especially in wireless communication system, the transmission capacity loss over the air interface may cause problems to the operators. Furthermore, processing capacity loss in, for example, GPRS supporting nodes may be significant. Packets may be lost due to too long latency. Users with no virus infected communications device are also affected indirectly by the transmission capacity loss and processing capacity loss. Furthermore, as the price for using wireless communication resources is typically considerable, a user with a virus infected communications device may have an unusually high invoice for data transmission services. It is also evident that virus infected data packets increase the risk to get a virus infection to a communications device or to a network node.

The present invention aims to address at least some of the problems discussed above.

SUMMARY OF THE INVENTION

In accordance with a first aspect of the invention, there is provided a method for limiting traffic in a communications system, the method comprising monitoring data packets traversing a first network node,
determining whether at least one first data packet originating from a source node fulfills a predefined criterion, and
instructing a second network node to change processing of at least one second data packet originating from said source node when the predefined criterion is fulfilled.

In accordance with a second aspect of the invention, there is provided a monitoring network node comprising monitoring means for monitoring data packets,
determining means for determining whether at least one first data packet originating from a source node fulfills a predefined criterion based on monitoring by said monitoring means, and
instructing means for instructing a further network node to change processing of at least one second data packet originating from said source node when the predefined criterion is fulfilled.

In accordance with a third aspect of the invention, there is provided an arrangement comprising a monitoring network node as defined above and a cleaning network node, wherein the monitoring network node is configured to instruct a further network node to reroute said at least one second data packet to said cleaning network node and said cleaning network node comprises means for receiving data packets from said further node,
removing means for removing faulty data from data packets and outputting cleaned data packets, and
forwarding means for forwarding said cleaned data packets towards their destination.

In accordance with a fourth aspect of the invention, there is provided a cleaning network node, comprising means for receiving data packets from a further node,
removing means for removing faulty data from data packets and outputting cleaned data packets, and
forwarding means for forwarding said cleaned data packets towards their destination.

In accordance with a fifth aspect of the invention, there is provided a communication system comprising a first network node, said communication system comprising monitoring means for monitoring data packets traversing said first network node,
determining means for determining whether at least one first data packet originating from a source node fulfills a predefined criterion based on monitoring by said monitoring means, and
instructing means for instructing a second network node to change processing of at least one second data packet originating from said source node when the predefined criterion is fulfilled.

In accordance with a sixth aspect of the invention, there is provided a computer program comprising program instructions for causing a data processing system comprising at least one data processing device to perform the following steps, when the program is run on the data processing system:

monitoring data packets traversing a first network node,
determining whether at least one first data packet originating from a source node fulfills a predefined criterion, and
instructing a second network node to change processing of at least one second data packet originating from said source node when the predefined criterion is fulfilled.

In accordance with a seventh aspect of the invention, there is provided a computer program comprising program instructions for causing a data processing system comprising at least one data processing device to perform the following steps, when the program is run on the data processing system:

removing faulty data from received data packets and outputting cleaned data packets, and
forwarding said cleaned data packets towards their destination.

BRIEF DESCRIPTION OF THE DRAWINGS

Embodiments of the present invention will now be described by way of example only with reference to the accompanying drawings, in which.

DETAILED DESCRIPTION OF EMBODIMENTS OF THE INVENTION

Figure 1:
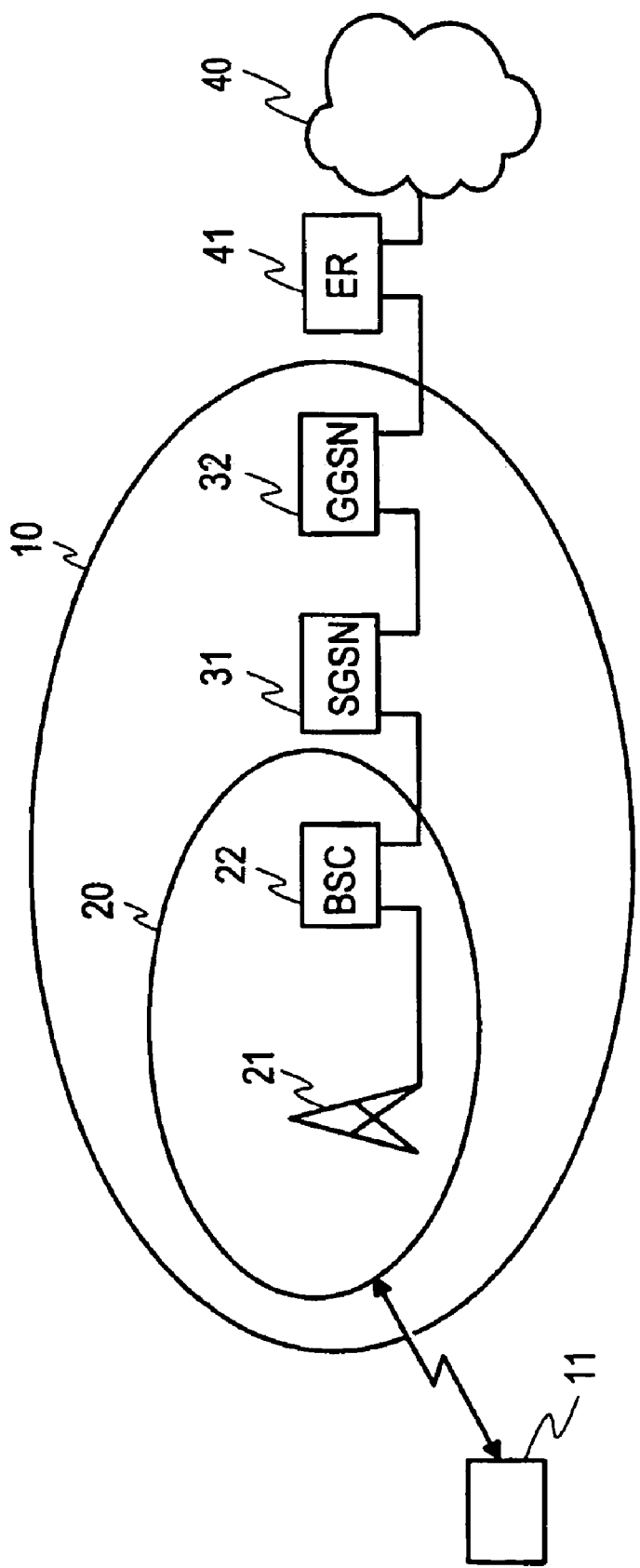
FIG. 1 shows schematically one example of a communication system in accordance with prior art.
Figure 2:
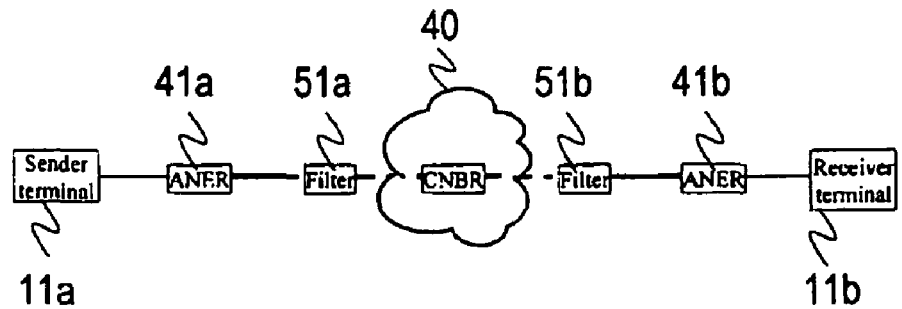
FIG. 2 shows schematically packet filtering in accordance with prior art.

FIGS. 1 and 2 have been discussed above in connection with the background of the invention.

In the following description of the embodiments of the invention, reference is often made to a GPRS system. It is, however, appreciated that the invention may be applicable to any other communication system supporting packet-switched data services. Some examples of such communication systems are the Universal Mobile Telecommunication System (UMTS), and the Wireless Local Area Network (WLAN).

One of the features of the present invention is to monitor data packets traversing network nodes. A data packet here refers to a protocol data unit, which typically contains one or more protocol headers and some payload data. Typically the payload data contains a protocol data unit of an upper layer protocol. Examples of protocols, which may be in use in a communication system supporting packet data services, are shown in FIG. 3.

Figure 3:
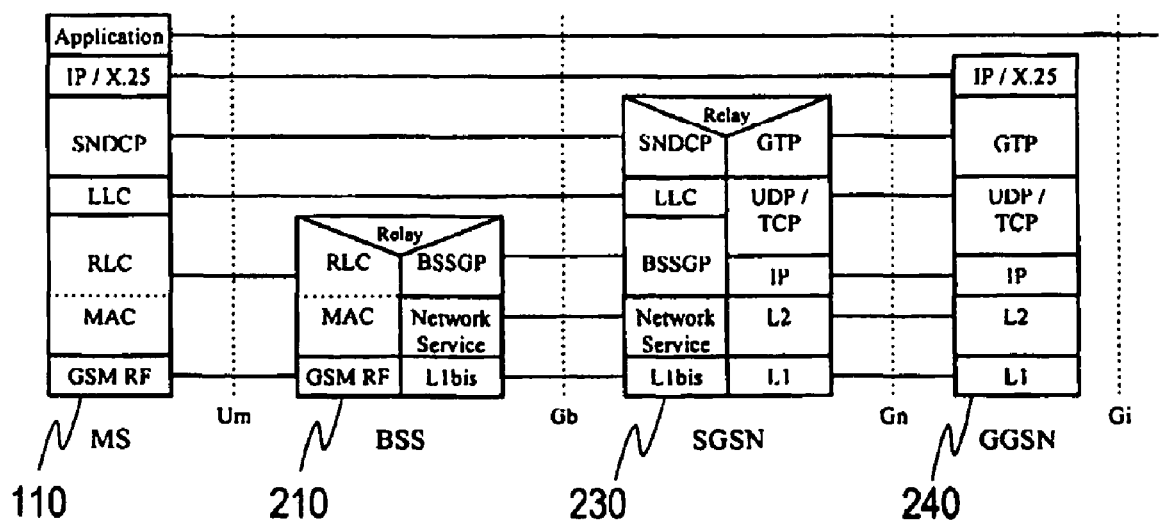
FIG. 3 shows schematically, as an example, protocol stacks in the communication system of FIG. 1.

FIG. 3 shows, as an example, schematically the protocol stacks of some of the network elements illustrated in FIG. 1 and identifies some interfaces. The interface between an SGSN and a BSS is called Gb. In the SGSN protocol stack 230 and in the BSS protocol stack 210 towards the SGSN the following protocols are common. The lowest protocol is called Layer 1bis. The second protocol is Network Service (NS), and the third protocol is Base Station System GPRS Protocol (BSSGP). The fourth protocol in the SGSN protocol stack in Link Layer Control (LLC), and the counterpart for this protocol entity is found in the MS protocol stack 110. In the BSS protocol stack 210, data is relayed between the Radio Link Control (RLC) protocol and the BSSGP protocol.

As FIG. 3 shows, the SSGN protocol stack 230 towards the GGSN and the GGSN protocol stack 240 have same protocol layers. The lowest protocol layer is L1 and on top of this is layer L2. On top of layer L2 is typically Internet Protocol (IP) layer, and on top of IP layer User Datagram Protocol (UDP) or Transfer Control Protocol (TCP). The highest protocol layer in the SSGN protocol stack 230 toward the GGSN is the GPRS Tunneling Protocol (GTP). In the SGSN protocol stack 230, data is relayed between the GTP protocol and the BSSGP protocol. In the GGSN protocol stack 240, there may be, for example, an IP layer or an X.25 on top of the GTP layer. The counterpart for this IP or X.25 layer is found in the MS protocol stack 110. The interface between the SSGN and GGSN is called Gn.

The interface between a MS and a BSS is called Um. The protocols are common in the MS protocol stack 110 and in the BSS protocol stack 210 towards the MS are the following: the lowest protocol is called the physical layer (PHY), the second in the Media Access Control (MAC) protocol and the third in the RLC protocol. In the MS protocol stack, there is further the LLC protocol. On top of the LLC protocol there are further protocols or applications. FIG. 3 shows a Subnetwork Dependent Convergent Protocol (SNDCP) and on top of that Internet Protocol (IP) or X.25 protocol.

The presence of viruses or other malware in a communications device may be detected by monitoring the data packets transmitted by the communications device. Some viruses, for example, cause a communications device to transmit data packets, whose payload contains data specific to the virus. Some viruses cause the communications device to transmit a typical sequence of data packets. For example, a port scanning attack contains of a series of data packets directed to a series of ports. As a further example, a disordered data packet sequence may indicate the presence of a virus, because a disordered data packet sequence may relate to a denial of service attack.

Viruses, other malware and also devices malfunctioning due to other causes may thus be detected by monitoring data packets in a communication system. Analysis of the protocol headers of the data packet may be sufficient in some cases, but analysis of the payload of the data packets (content of the data packets) may sometimes be needed. Furthermore, it is possible that the contents of more than one data packet are needed to determine whether the data packets relate to a virus, to other malware or to other malfunction.

It may also be possible to determine the presence of viruses or other malware by the traffic characteristics relating to a given communications device. For example, viruses typically cause communications devices to send small data packets and/or a large number of data packets. Thus it may be possible to define predefined limits to the average size of data packets or to the average number of data packets per time unit. If the average size of data packets is smaller than a predefined limit, malware infection or other malfunction may be suspected. For example, in monitoring a GPRS network it was noticed that an average user data packet size is about 330 bytes. An average size of data packet sent by viruses, on the other hand, was about 50 bytes. Similarly, if the average number of data packet per time unit is larger than the predefined limit, virus infection may be suspected. In the same GPRS network study, the average number of packets transmitted by non-virus-infected communications devices was about 120 packets/minute. For virus-infected communications device the average number of packets was over 600 packets/minute. As a further example, it may also be possible to determine the number of data packets smaller than a predefined size per time unit. If this number is larger than a predefined number, virus infection may be suspected.

In embodiments of the invention, data packets in a communication network are monitored. Monitoring is carried out as a parallel process to transmitting further data packets from the monitored network node. Monitoring data packets does not directly affect the data packets traversing a network node, and thus monitoring does not cause delay to data packets. For example, packet filtering (see FIG. 2) causes typically delay to all processed data packets, because all data packets processed before they are transmitted further. Furthermore, a small data packet and a large data packet typically require similar amount of packet filtering processing capacity.

Figure 4:
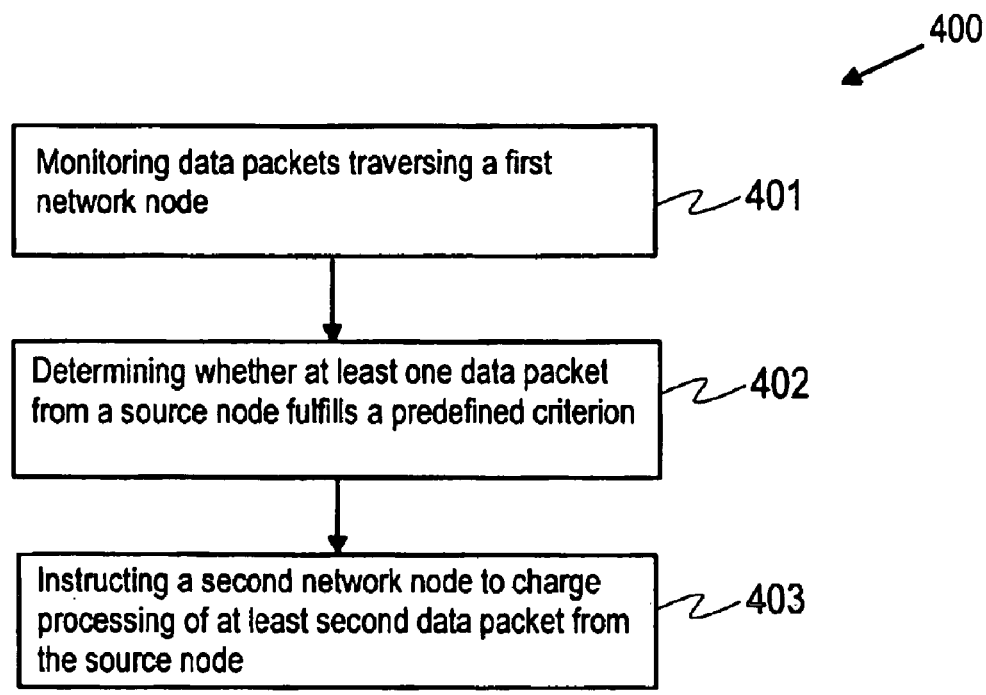
FIG. 4 shows a flowchart of a method in accordance with an embodiment of the invention.

FIG. 4 shows a flowchart of a method 400 in accordance with an embodiment of the invention. In step 401, data packets traversing a first network (for example, a network node 510 in FIG. 5) node are monitored. This monitoring may be a continuous action, or there may be set a trigger condition for starting monitoring. For example, monitoring may be carried out when the load in the network (or a given subnetwork) exceeds a predefined threshold and/or the number of small data packets per time unit exceeds a predefined threshold.

The monitoring is typically carried out on a source node basis, keeping track of packets each source node transferring data via the first network node transmits. In step 402, it is determined whether at least one data packet originating from a source node fulfills a predefined criterion or at least one predefined criterion, if a set of predefined criteria has been defined.

Some examples of the predefined criterion are the following: a specific payload in a data packet; a specific sequence of data packets; a disordered data packet sequence; number of connection establishment packets per time unit; average data packet size below a predefined threshold; or number of small data packets (size below a given threshold) exceeds a predefined threshold. It is clear to a skilled person that these criteria may be combined so that at least one criterion needs to be fulfilled for triggering further action or that at least a certain number of criterion needs to be fulfilled for the triggering to take place. Similarly, it is clear to a skilled person that in some cases it may be sufficient to detect only one data packet originating from a given communications device. In other cases, it may be necessary to monitor more than one data packet.

In step 403, a second network node (for example, a network node 520 in FIG. 5) is instructed to change processing of at least one further data packet originating from the source node relating to which the at least one predefined criterion is fulfilled. The second network node may be, for example, instructed to change routing of data packets originating from the source node or to drop data packets originating from the source node. If it is determined that a source node is malfunctioning and it is expected that not one of the data packets from this source node contains useful data, dropping further data packets may be a feasible option. On the other hand, if it is determined, that a source node may be infected with malware, rerouting data packets originating from this source node to a specific cleaning node may be a suitable solution.

The time period during which rerouting or dropping of data packets is carried out may vary. Rerouting or dropping of packets may be done, for example, until the source node is cleaned from malware infection or malfunctioning is fixed. This cleaning or fixing may be done by a network operator or by a user of the source node. If the cleaning/fixing is carried out by the network (operator), it is possible to stop rerouting or dropping of packets in response to the cleaning/fixing. If the user of the source node carries out the cleaning/fixing, it is possible that a monitoring network node (or, more generally, monitoring functionality present in the network) is informed about the cleaning/fixing. As a further option, the monitoring network node may notice the cleaning/fixing of the source node by monitoring data packets originating from the source node. In any case, the rerouting or dropping of data packets may be stopped by administrative actions of a network operator.

Figure 5:
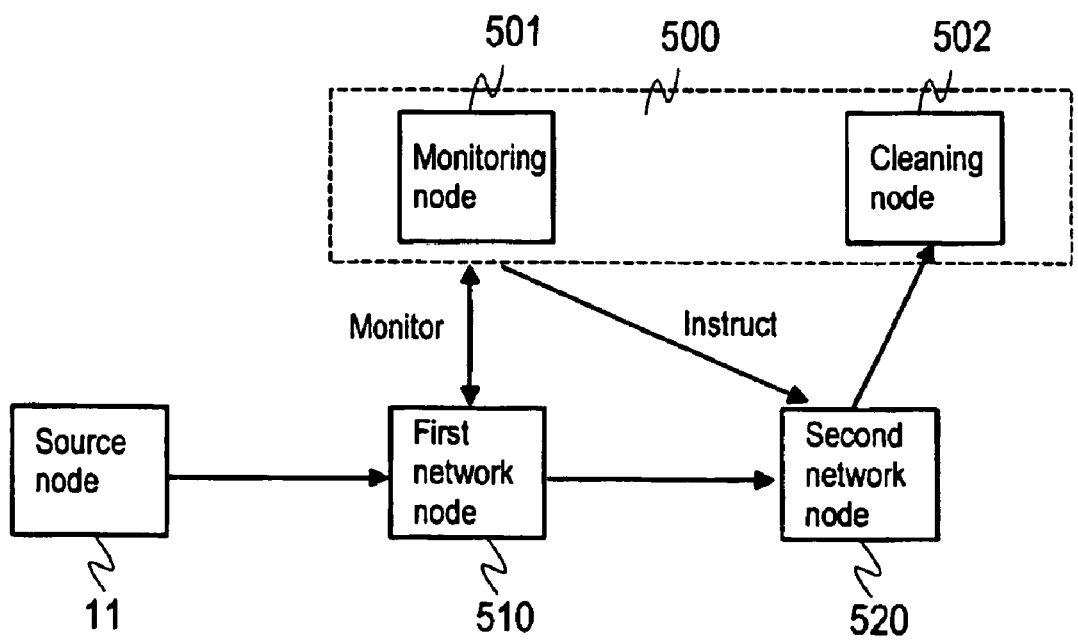
FIG. 5 shows an arrangement and network elements of a communications system in accordance with an embodiment of the invention.

FIG. 5 shows, as an example, an arrangement 500 and network elements 501, 502 of a communications system in accordance with an embodiment of the invention. A monitoring node 501 is responsible for monitoring data packets traversing a first network node 510, for determining whether data packets originating from a source node fulfill at least one predetermined criterion and for instructing a second network node 520, when the at least one predefined criterion is fulfilled. It is appreciated that alternatively to providing this functionality in a separate monitoring node 501, the functionality of the monitoring node 501 may be integrated, for example, in the first network node 510.

A cleaning node 502 is responsible for inspecting data packet and, if possible, removing faulty data packets among data packets originating from the source node and forwarding cleaned data packets towards their original destination. The removal of faulty data packets refers to dropping faulty data packets and/or to removing faulty data from the payload of data packets. Below the functionality of a cleaning node is discussed in more detail in connection with faulty data packets relating to malware.

In some embodiments of the invention, there is provided an arrangement 500 containing the monitoring node 501 and the cleaning node 502. The functionality described above to the located in the monitoring node 501 may, alternatively, be situated in any network node in a communications system or it may be distributed among a plurality of network nodes in a communications system. Typically functionality of the monitoring node 501 and the network node 501, which is being monitored, are operated by a same network operator. Furthermore, the cleaning node 502 may also be operated by the same network operator. Alternatively, the functionality of the monitoring node 501 and the (possible) cleaning node 502 may be provided for a network operator by a third party.

It is possible that the second network node 520 is operated by the same network operator as the first network node 510. Alternatively, the first network node 510 may be, for example, an edge router or a GGSN operated by an access network operator and the second network node 520 may be, for example, a backbone router operated by a backbone network operator.

Figure 6:
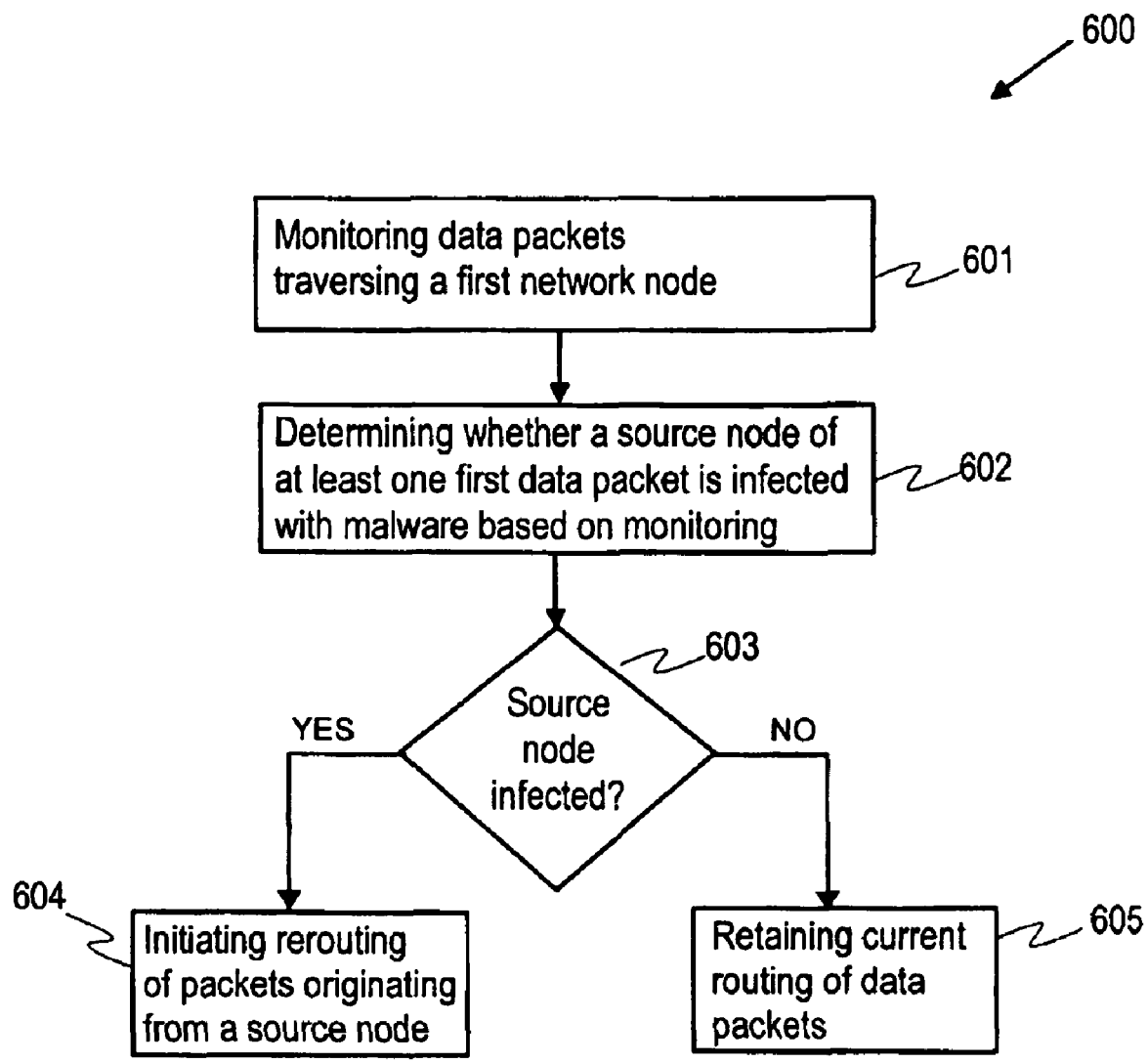
FIG. 6 shows a flowchart of a method in accordance with a further embodiment of the invention.

FIG. 6 shows a flowchart of a method 600 in accordance with a further embodiment of the invention. The further embodiment relates, by way of example, to detecting source nodes infected with malware. In step 601, data packets traversing a first network node are monitored, similarly as in step 401. The first network node may be, for example, an edge router ER 41 in FIG. 1. Alternatively, the first network node may be the GGSN. The data packets may, for example, originate from a communications device 11 and their destination may be a communications device reachable via the public data network 40. Typically all data packets traversing the first network node are monitored.

In step 602 it is determined whether a source node of at least one first data packet is infected with malware, for example, with a virus, based on said monitoring of step 601. Some possible criteria for determining that a source node is infected with malware are mentioned above. It is appreciated that for some viruses (malware), it may be sufficient to detect only one data packet originating from a given communications device. For other viruses (malware), it may be necessary to monitor more than one data packet.

In step 603, it is checked whether a source node is determined to be infected by malware. If yes, rerouting of further data packets originating from said source node is initiated in step 604, typically by instructing a second network node to reroute the data packets originating from the source node. This rerouting causes further data packets originating from the source node to be routed to a data packet cleaning network node, where infected data may be removed from the further data packets. Alternatively the further data packets of infected source are dropped in the second network node, as discussed above. If a source node is not determined to be infected by malware, the original routing of data packets originating from the source node is retained in step 605. Typically retaining original routing does not require any specific actions. Rerouting of data packets, on the other hand, typically involves transmitting to a further network node (a router) instructions to update routing information. For example, routing information of a next router, to which data packets traversing the first network element proceed, may be updated. The updated routing information in the next router then specifies a new route for data packets originating from the source node. It is generally possible to detect packets originating from the source node by studying the header fields of packets. Typically a packet header contains information identifying the source. The instructions to update routing information in the next router may be sent using, for example, a MIDCOM (Middlebox communication) protocol or Simple Network Management Protocol (SNMP).

As data packets are rerouted based on the monitoring, some data packet originating from a malware-infected communications device may traverse the first network node, which is being monitored, before the malware infection is detected. After the detection of the malware infection, further data packets are rerouted for removing or dropping infected data. It is appreciated that although possibly some data packets containing infected data are routed normally in the network, the amount of data packets in a communication system may be reduced efficiently. Packet filtering might detect and drop also the very first infected data packets, but packet filtering delays all data packets. In embodiments of the invention, typically only the rerouted data packets are delayed. This means that data packet originating from other source nodes and traversing the first network node are not delayed because one source node is malfunctioning and the packet from this source node need, in some cases, to be processed in more detail.

The malware identifying algorithm, which is used to determine the presence of a malware in a source node based on monitoring of the data packets traversing the first network node, may take into account various virus identify features, such as sequence port scanning packets or well known port attacking packets. Port attacking packets are mainly UDP packets for session establishment. The virus identifying algorithms may be updated as new viruses emerge.

Figure 7:
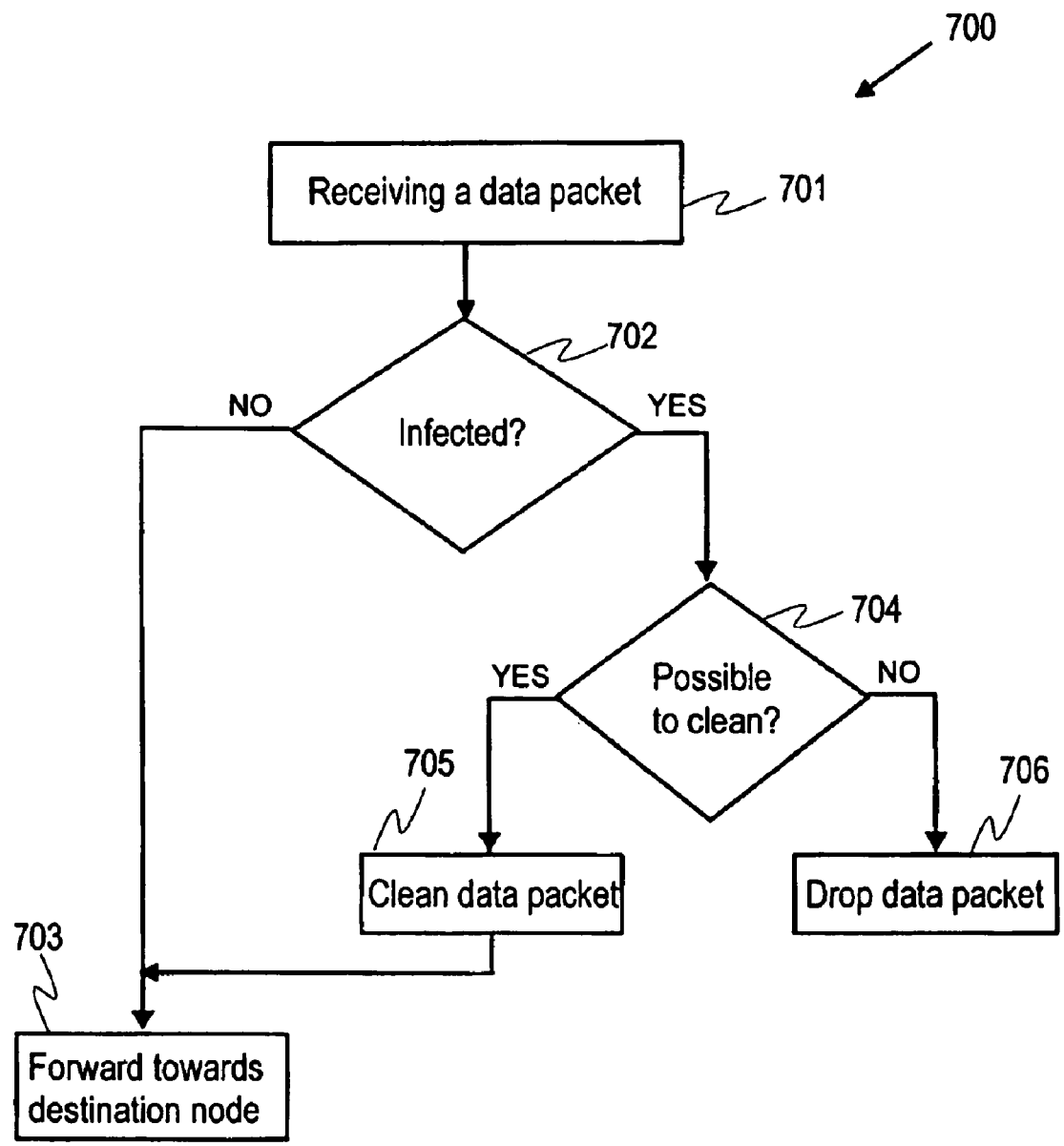
FIG. 7 shows a flowchart of a further method in accordance with a further embodiment of the invention.

Data packets from a source node possibly infected with malware are rerouted to a network node or network segment, where infected data can be removed from data packets. FIG. 7 shows a flowchart of a further method 700 in accordance with an embodiment of the invention. In step 701 rerouted data packets are received in a network element. In step 702, it may be checked whether these rerouted data packets are infected. If no, the rerouted data packets may be forwarded to their destination in step 703. Typically this is done by sending the rerouted data packets to a next network node towards the original destination and having the original routing information. If the rerouted data packets are infected, in step 704 it may be checked whether the rerouted data packets may be cleaned. If cleaning is possible, infected data may be removed from data packets (typically from the payload) in step 705. The details of how to clean a data packet depend typically from virus to virus and data packet to data packet. A specific cleaning algorithm is typically needed, and this cleaning algorithm may be updated when new viruses emerge. Thereafter the cleaned data packets are transmitted towards their original destination in step 703. If cleaning is not possible, for example because of the overload of the network node or the rerouted data packet contains only information relating to malware, not any user data, a rerouted data packet may be dropped in step 706.

It is appreciated that the flowcharts in FIGS. 4 to 7 are provided as examples. The order of steps and number of steps may be varied.

Figure 8:
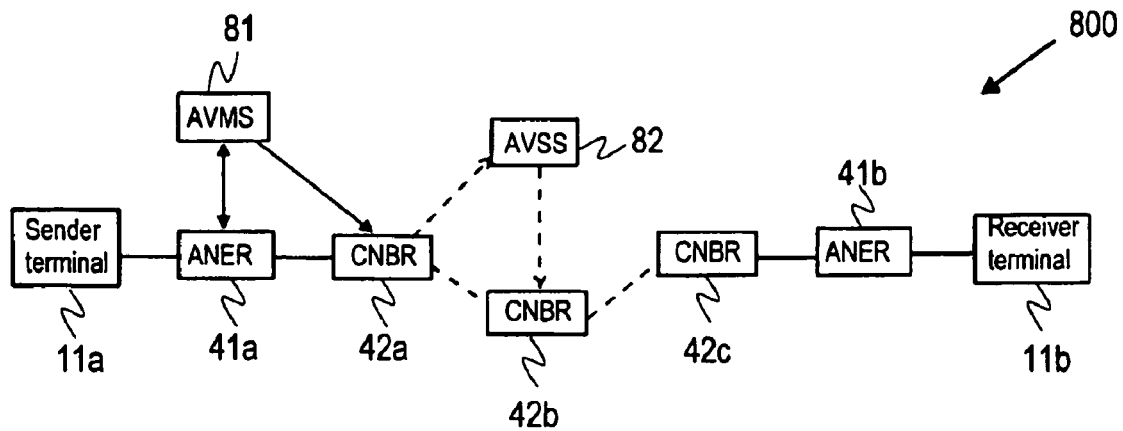
FIG. 8 shows, as an example, schematically a communication system in accordance with a further embodiment of the invention.

FIG. 8 shows, as an example, schematically a communication system 800 in accordance with a further embodiment of the invention. The communication system 800 contains two edge routers 41a, 41b and three backbone routers 42a, 42b, 42c. In addition, FIG. 8 shows a sender communications device 11a and a receiver communications device 11b. It is evident to a skilled person that data packets typically go in both directions between the sender and the receiver communications devices 11a, 11b, but in connection with FIG. 8 only one direction of transmitting data packets is discussed in detail. The sender and receiver communication devices 11a, 11b may be connected to the edge routers, for example, by a GRPS system.

The monitoring node 81 is in FIG. 8 called an Anti-Virus Monitor Server (AVMS). It is configured to monitor traffic traversing the edge router 41a, especially towards the core network (in other words, in the uplink direction; data packets originating from the communications device 11a). The monitoring node 81, when detecting presence of a source node (communications device) infected with a virus, instructs one of the backbone routers to update its routing information so that further packets from the same communications device are rerouted to a data packet cleaning node 83. This second node 82 is in FIG. 8 called an Anti-Virus Service Server (AVSS). The functionality of this data packet cleaning node 82 is, for example, that discussed in connection with FIG. 7 above.

The backbone router, whose routing tables are updated, is typically the backbone router 42a to which the edge router 41a is connected. Cleaned data packets from the AVSS node 82 are sent to a further router 42b. As the routing information of this further router 42b has typically not been updated to reroute data packets originating from the source 11a, the data packets arriving to this router 42b are transmitted towards the original destination.

It is appreciated that the monitoring network node 81 and the data packet cleaning network node 82 can efficiently reduce malware infected traffic coming from the edge router 41a to the backbone router network. The monitoring network node 81 and the data packet cleaning network node 82 also reduce malware infected traffic in, for example, the network (segment) behind the edge router 41b. By carrying out similar monitoring and cleaning of traffic for the edge router 41b and other edge routers, malware infected traffic coming towards the edge router 41a can be reduced.

It is appreciated that the monitoring node 81 or the data packet cleaning network node 82 may be configured to inform the communication device 11a, if the communications device 11a is detected to be infected by malware. By providing this feedback and the communications device 11a removing the malware, it is possible to reduce the amount of traffic caused by malware in the network (segment) behind the edge router 41a. The communications device 11a may be informed of the (possible, suspected) presence of malware, for example, using short message service (SMS), electronic mail or any other suitable messaging means. By informing the communications device of possible malware, the user may become aware of the malware before, for example, the costs relating to the communication resources used by the virus are substantial.

It is appreciated that similar reasoning applies to FIG. 5 and limiting in general faulty traffic in a communications system. In some cases it may be sufficient, instead of rerouting data packets to a cleaning node, to have a monitoring network node instructing a second network node (for example, router) simply to drop data packets determined to be originating from a malfunctioning (including malware infected) source node.

Figure 9:
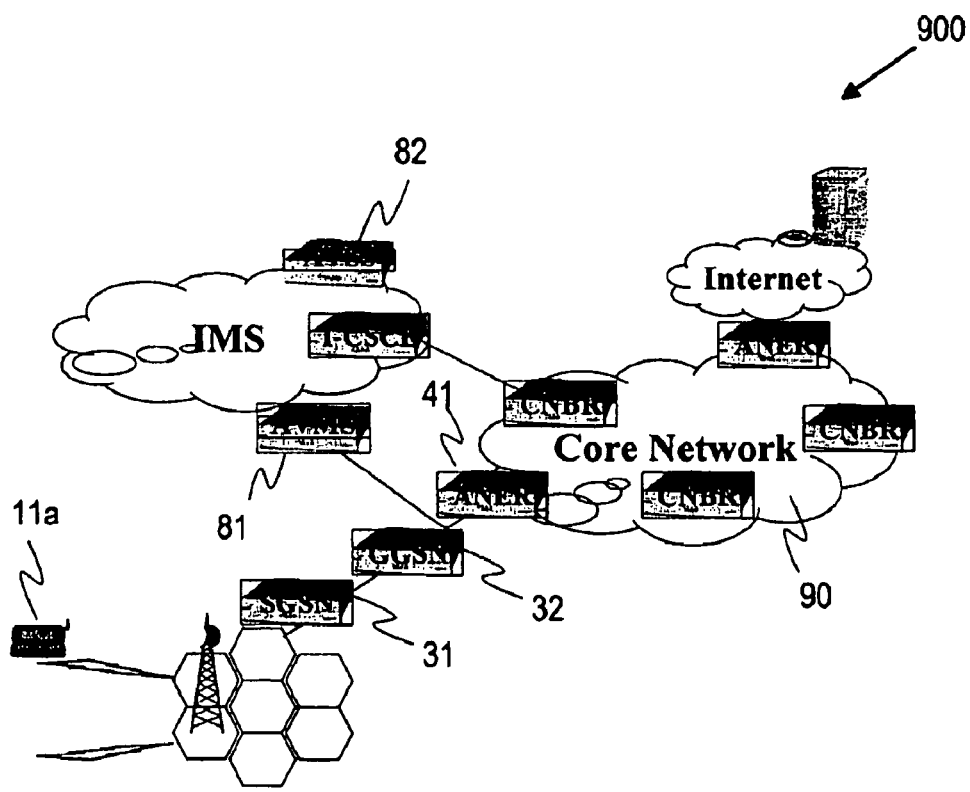
FIG. 9 shows, as a further example, schematically a further communication system in accordance with a further embodiment of the invention.

FIG. 9 shows schematically a further communication system 900 in accordance with an embodiment of the invention. In the communication system 900, the monitoring node 81 and the data packet cleaning node 82 reside in an IP Multimedia Subsystem (IMS) network. The monitoring node 81 and the data packet cleaning node 82 in FIG. 9 effectively reduce the amount of virus infected traffic from the GGSN towards the core network 90. The core network 90 is, in turn, connected via a further edge router to public data network, for example, to the Internet.

It is appreciated that the monitoring functionality is usually placed so that data packets from a certain network (segment) can be monitored. As described above, the monitoring, determining fulfillment of a predefined criterion and instructing functionality can be provided in a separate monitoring network node. Alternatively, this functionality can be placed, for example, in the network node which the monitored data packets are traversing. For example, an edge router may be provided with this functionality.

In the above description the functionality in accordance with some embodiments of the invention is provided by two network nodes, the monitoring node and the data packet cleaning node. It is appreciated, however, that the functionality of monitoring, detecting faulty data packets and cleaning infected data packets may be provided by a larger number of network nodes. Data packets may be rerouted, for example, to one of a plurality of data packet cleaning nodes. The choice of the cleaning node may depend, for example, on the load of the cleaning nodes or on the malware type detected in the source node. It is possible, for example, to define a set of different predefined criteria for handling different fault situations differently. As one example, there may be a set of cleaning network nodes and the selection of rerouting target is based on which criterion is fulfilled.

It is appreciated that in this description and in the appended claims the term faulty data packet refers to a data packet comprising faulty data, for example malware infected data, or a data packet uselessly wasting network resources. Removing faulty data covers at least the following options: dropping data packet containing faulty data or processing (cleaning) data packets containing faulty data so that the faulty data (for example, a faulty payload part) is removed data packets.

It is appreciated that embodiments of the invention may be implemented as hardware, software or a suitable combination of hardware and software.

It is appreciated that in the appended claims the term source node is intended to cover any network node or a communications device. The term communications device refers here to any communications device capable of communicating via a communications system. Examples of communications devices are user equipment, mobile telephones, mobile stations, personal digital assistants, laptop computers and the like. Furthermore, a communications device need not be a device directly used by human users.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
   monitoring data packets that originate from a source node and traverse a first network node, where the data packets are transmitted from the first network node to a second network node while being routed towards a destination node;
   determining whether at least one first data packet originating from the source node and intended for routing to the destination node via the second network node fulfills a predefined criterion;
   where monitoring and determining are performed in parallel with transmitting the at least one first data packet to the second network node from the first network node such that the at least one first data packet is routed as received towards said destination node regardless of a result of the monitoring and determining; and
   in response to a determination that the predefined criterion is fulfilled generating an instruction for said second network node to update router information to specify a new route for subsequent data packets originating from the source node so as to re-route to a third network node at least one second data packet originating from said source node and intended for routing to said destination node.

2. The method as defined in claim 1, comprising rerouting said at least one second data packet to the third network node.

3. The method as defined in claim 1, comprising removing faulty data from data packets in the third network node.

4. The method as defined in claim 1, comprising cleaning faulty data packets in the third network node.

5. The method as defined in claim 3, comprising dropping faulty data packets in the third network node.

6. The method as defined in claim 1, comprising transmitting data packets towards the destination node from the third network node.

7. The method as defined in claim 1, wherein said determining whether a predefined criterion is fulfilled is based on monitoring of at least said at least one first data packet.

8. The method as defined in claim 1, wherein said predefined criterion takes into account at least one of a number of data packets originating from said source node per time unit, a size of the data packets originating from said source node, a predefined data packet originating from said source node, a disordered data packet sequence originating from said source node, port scanning sequence in data packets originating from said source node, and port attacking sequence in data packets originating from said source node.

9. An apparatus, comprising:
   a monitor configured to monitor data packets that originate from a source node and traverse a first network node, where the data packets are transmitted from the first network node to a second network node while being routed towards a destination node;
   a determiner configured to determine whether at least one first data packet originating from the source node and intended for routing to the destination node via the second network node fulfills a predefined criterion based on monitoring by said monitor;
   a transmitter to transmit the at least one first data packet to the second network node in parallel with operation of the monitor and the determiner, where said monitor and said determiner operate in parallel with the first network node transmitting the at least one first data packet to the second network node such that the at least one first data packet is routed as received towards said destination node regardless of a result of operation of the monitor and determiner; and
   a generator configured to, in response to a determination at said determiner that said predefined criterion is fulfilled, generate an instruction for said second network node to update router information to specify a new route for subsequent data packets originating from the source node so as to reroute to a third network node at least one second data packet originating from said source node and intended for routing to said destination node.

10. The apparatus as defined in claim 9, wherein said determiner is configured to determine whether said predefined criterion is fulfilled based on monitoring of at least said at least one first data packet.

11. The apparatus as defined in claim 9, wherein said predefined criterion takes into account at least one of a number of data packets originating from said source node per time unit, a size of the data packets originating from said source node, a predefined data packet originating from said source node, a disordered data packet sequence originating from said source node, port scanning sequence in data packets originating from said source node, and port attacking sequence in data packets originating from said source node.

12. A system, comprising:
   a packet monitor configured to monitor data packets that originate from a source node and traverse a first network node, where the data packets are transmitted from the first network node to a second network node while being routed towards a destination node;

a determiner configured to determine whether at least one first data packet originating from the source node and intended for routing to the destination node via the second network node fulfills a predefined criterion based on monitoring by said packet monitor;

a transmitter to transmit the at least one first data packet to the second network node in parallel with operation of the packet monitor and determiner, where said packet monitor and said determiner operate in parallel with the first network node transmitting the at least one first data packet to the second network node such that the at least one first data packet is routed as received towards said destination node regardless of a result of operation of the packet monitor and determiner; and an instructing unit configured to, in response to a determination at said determiner that said predefined criterion is fulfilled, instruct said second network node to update router information to specify a new route for subsequent data packets originating from the source node so as to reroute to a third network node at least one second data packet originating from said source node and intended for routing to said destination node.

13. The system as defined in claim 12, wherein the second network node is responsive to said instructing unit to update the router information.

14. The system as defined in claim 12, the third network node comprising:

a remover configured to remove faulty data from data packets and output cleaned data packets; and a forwarder configured to forward said cleaned data packets towards the destination node.

15. The system as defined in claim 12, wherein said packet monitor, said determiner and said instructing unit comprise a part of a monitoring network node separate from said first network node.

16. The system as defined in claim 12, wherein said packet monitor, said determiner and said instructing unit comprise a part of said first network node.

17. A computer program embodied on a non-transitory computer readable medium, said computer program comprising instructions for causing a data processor to perform:

monitoring data packets that originate from a source node and traverse a first network node, where the data packets are transmitted from the first network node to a second network node while being routed towards a destination node;

determining whether at least one first data packet originating from the source node and intended for routing to the destination node via the second network node fulfills a predefined criterion;

where monitoring and determining are performed in parallel with transmitting the at least one first data packet to the second network node from the first network node such that the at least one first data packet is routed as received towards said destination node regardless of a result of the monitoring and determining; and in response to a determination that the predefined criterion is fulfilled generating an instruction for said second network node to update router information to specify a new route for subsequent data packets originating from the source node so as to reroute to a third network node at least one second data packet originating from said source node and intended for routing to said destination node.

* * * * *